May 31, 1932.  F. W. CUTLER  1,860,732
GRADING MACHINE
Filed May 8, 1929
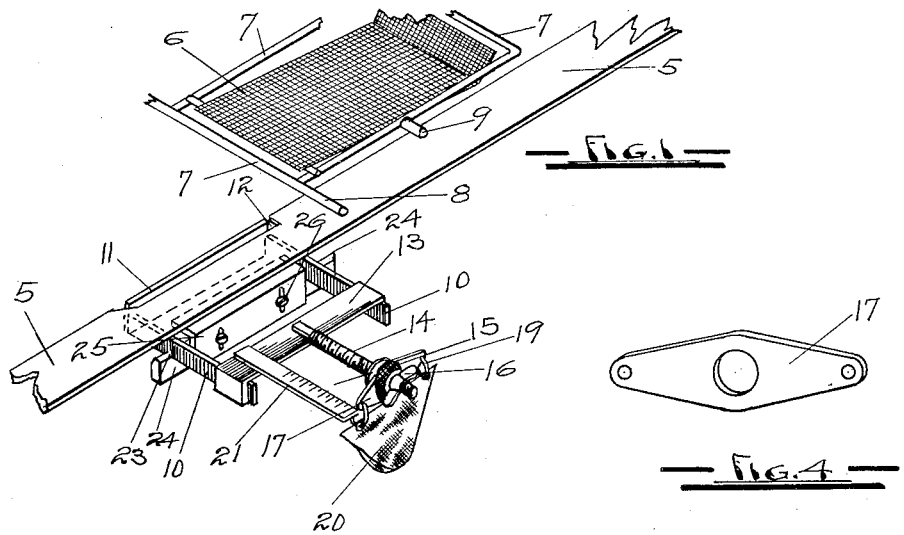
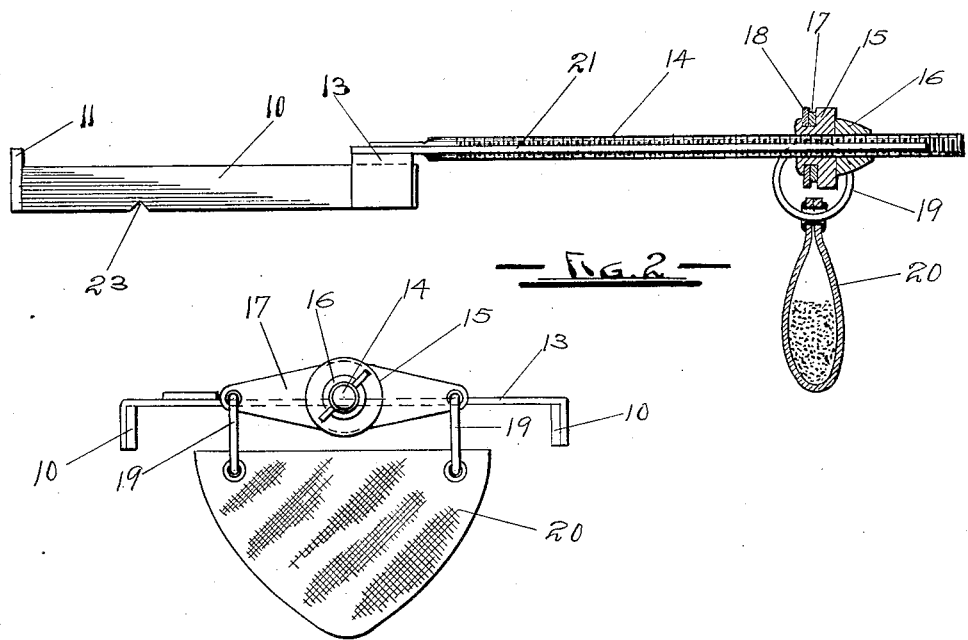
INVENTOR
FRANK W. CUTLER
BY C. F. Blake
ATTY.

Patented May 31, 1932

1,860,732

UNITED STATES PATENT OFFICE

FRANK W. CUTLER, OF PORTLAND, OREGON, ASSIGNOR TO FOOD MACHINERY CORPORATION, OF SAN JOSE, CALIFORNIA, A CORPORATION OF DELAWARE

GRADING MACHINE

Application filed May 8, 1929. Serial No. 361,351.

My invention relates to grading machines in general, and particularly to fruit grading machines in which the fruit is graded to size according to its weight. The present invention relates to the weighing device in such graders and is an improvement upon that disclosed in Patent No. 1,184,697 and also that of Patent No. 1,633,002, both of which were issued to me and assigned to the Cutler Manufacturing Company of Portland, Oregon.

In the former of said patents the weighing device consisted of a weight threaded upon a stem, and thus adjustable for various sizes of graded fruit. It was found in practice, however, that this device caused a vibration of the bar over which the fruit conveying pockets traversed in their course through the machine, which vibration interfered with the accuracy of the grading by frequently allowing the dropping of a piece of fruit into a receptacle other than that to which it belonged. The vibration was caused by the rigid character of the weighing device. To obviate that defect the weighing device disclosed in the latter patent consisted of a fabric bag in which was hung a specimen of the fruit to be dropped into the corresponding receptacle. The fabric bag provided sufficient elasticity to prevent the objectionable vibration, but it also was objectionable because of the lack of adjustability and the possibility of the fruit used as the weight being interfered with by attendants.

The object of the present invention is to provide a weighing device for such grading machines that combines the adjustable feature of that disclosed in the former of said patents with the yieldable feature of that disclosed in the latter thereof. I accomplish this object by means of the construction illustrated in the accompanying drawings, which is a part of this application for Letters Patent, like characters indicating like parts throughout the several views thereof and in which:

Fig. 1 is a perspective view of my device installed upon a grading machine, a portion of the machine being also shown.

Fig. 2 is a side elevation of my device.

Fig. 3 is a front elevation of my device in the direction of arrow 3 in Fig. 1.

Fig. 4 is a perspective view of the weight cross-bar.

The general type of machine in which this device is particularly useful is that disclosed in each of the above mentioned patents, and consists of a track 5 with fruit carrying pockets 6 adjacent thereto. Said pockets are disposed within a frame 7 which is provided with an extension 8 adapted to travel along said track. Said frames are propelled by means of a chain or other suitable device, which not being a part of the present invention, and being well known to the art and disclosed in said patents is not further illustrated or described herein. A finger 9, being a portion of said pocket frame, also slides upon said track as the pockets are moved along, and thus serves to retain the traveling pocket in substantially horizontal position, as shown in Fig. 1, thus allowing the fruit to remain therein until the pocket is dumped and the fruit allowed to fall into a suitable receptacle.

The grading is accomplished by a series of weighing devices positioned at intervals along the track 5. Each weighing device allows the pocket frames to pass thereover undisturbed if the fruit therein is of lighter weight than the setting of the weighing device calls for, but when a pocket arrives at a weighing device set to operate at a weight corresponding to that of the piece of fruit occupying the pocket, then said pocket is dumped, and the fruit allowed to fall therefrom into a suitable receptacle provided therefor.

The weighing device consists of a rectangular frame having side bars 10 and a rear bar 11 rigidly connected. Said rear bar 11 projects upward beyond said side bars 10 as shown in Fig. 2, its upper edge being substantially in the upper plane of the track 5, and positioned in a longitudinal notch 12 in said track. The finger 9 of the pocket frame is sufficiently short so that it would fall into said notch 12 if the bar 11 were not located therein, but with the said bar in its normal position in said notch the finger 9 rides across the notch upon the bar, and thus the corresponding pocket is not dropped from its fruit containing position, as shown in Fig. 1.

At the outer ends of said side bars 10 there is positioned a cross member 13 secured to each of said side bars, and secured upon said cross member, and extending outwardly therefrom is a threaded bar 14. Threaded upon said bar 14 is a thimble 15 having a knurled edge, and a thumbnut 16 adapted to lock said thimble in place upon the bar 14. A weight bar 17 is oscillatably mounted upon the hub of said thimble 15, and is held thereupon by a washer 18 upon which the end of said hub is turned or slightly riveted, as shown in Fig. 2. Suspended from said weight bar 17 by means of rings 19 is a woven fabric bag 20 partially filled with a granulated material, such as shot or the like, to act as the weight.

Also secured upon said crossbar 13 is a scale bar 21 for the purpose of indicating the position of the weight bar upon the screw member 14 to the end that repeated settings of the weight at the same position may be readily accomplished.

The side bars of the weighing device 10 are notched upon their lower edges at 23 and said notches rest upon a knife edge crossbar 24, thus fulcruming the weighing device. Said knife edged bar 24 is secured upon a bracket 25 depending from the track 5 in a vertically adjustably manner, such as the slots and screws shown at 26 in Fig. 1.

By this construction adjustability of the weight to the size of the fruit it is desired to drop at any one scale is readily attained, and also the necessary yieldability to prevent undue vibration is secured by the use of the woven fabric bag 20 and the granulated weight filling of the same which may slightly shift its position as the bag moves downward and comes to rest.

My invention may be made of any materials and constructed of any size deemed convenient and suitable for a device of this character, and while I have illustrated and described a form of construction and relation of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a grading machine: a weighted grading device comprising a pivotally mounted member; an adjustable weight carrying device upon said member; a yieldable weight containing member upon said adjustable carrying device; and yieldable weight material within said containing member.

2. In a grading machine: a track; a fulcrum upon said track; a frame mounted upon said fulcrum and having a member thereof alined with said track longitudinally thereof; an adjustable weight carrying member secured upon said frame; a yieldable weight containing member upon said weight carrying member; and yieldable weighing material within said containing member.

3. In a grading machine: a weighing device having an adjustable weight carrying member; a thimble threaded upon said member; a cross-bar rotatably mounted upon said thimble; and granulated weighing material within a fabric bag hung from said crossbar.

4. In a grading machine a track having a depressible portion, a lever adapted to operate said depressible portion, and a yieldably mounted weight carried by said lever.

5. In a grading machine, a track having a depressible portion, a lever having one end adapted to operate said depressible portion, and an adjustably mounted yieldable weight carried by the opposite end of said lever.

6. In a grading machine a track having a depressible portion, a lever having one end adapted to operate said depressible portion, and an adjustably mounted elastic weight carrying member supported by the other end of said lever.

7. In a grading machine a track having a pivotally mounted depressible portion, a yieldable weight carrying receptacle adjustably mounted on said depressible portion and a weight carried in said receptacle, said weight comprising a flowable material.

In witness whereof I claim the foregoing as my own I hereunto affix my signature at Portland, county of Multnomah, State of Oregon, this 6th day of April, 1929.

FRANK W. CUTLER.